United States Patent [19]
Usuki

[11] Patent Number: 5,914,151
[45] Date of Patent: Jun. 22, 1999

[54] METHOD FOR FORMING SILICA PROTECTIVE FILMS

[75] Inventor: Kazuyuki Usuki, Kanagawa-ken, Japan

[73] Assignee: Fuji Photo Film Co., Ltd., Kanagawa-ken, Japan

[21] Appl. No.: 08/654,672

[22] Filed: May 29, 1996

[30] Foreign Application Priority Data

May 29, 1995 [JP] Japan ................................. 7-130788
May 29, 1995 [JP] Japan ................................. 7-130796
Sep. 7, 1995 [JP] Japan ................................. 7-230349

[51] Int. Cl.$^6$ ................................. G11B 5/66; B05D 5/12
[52] U.S. Cl. ..................... 427/128; 427/129; 427/130; 427/131; 427/255; 427/387; 428/694 TP; 428/900
[58] Field of Search ................................. 427/255, 387, 427/130, 131, 129, 128; 428/694 TP, 900

[56] References Cited

U.S. PATENT DOCUMENTS

| | | | |
|---|---|---|---|
| 4,069,360 | 1/1978 | Yanagisawa et al. | 428/623 |
| 5,316,844 | 5/1994 | Suzuki et al. | 428/323 |
| 5,358,739 | 10/1994 | Baney et al. | 427/226 |

FOREIGN PATENT DOCUMENTS

A2 0481434  4/1992  European Pat. Off. .

OTHER PUBLICATIONS

Derwert Publications, Ltd., London, GB; AN 86135222; XP002013924; JP–A–61 073 227 (NEC Corp) Apr. 15, 1986; *abstract.

*Primary Examiner*—Leszek Kiliman
*Attorney, Agent, or Firm*—Sughrue, Mion, Zinn, Macpeak & Seas, PLLC

[57] ABSTRACT

A coating film, which is constituted of a polysilazane, is formed on a substrate. The polysilazane in the coating film is then oxidized by being brought into contact with active oxygen or ozone, or by being exposed to light. A protective film, which is constituted of silica, is thereby formed on the substrate. An inorganic protective film is also provided, which comprises an inorganic oxide film, that is obtained by subjecting a polysilazane coating film to oxidation treatment, and fine particles contained in the inorganic oxide film.

2 Claims, No Drawings

METHOD FOR FORMING SILICA PROTECTIVE FILMS

BACKGROUND OF THE INVENTION

1. Field of the Invention

This invention relates to a method for forming a silica protective film, which serves to improve mechanical characteristics and corrosion resistance of the surface of a material, such that the silica protective film may exhibit good film-forming properties under low temperature conditions and may have a high mechanical strength. This invention also relates to a process for producing a magnetic recording medium, which is provided with the silica protective film. This invention further relates to an inorganic protective film, which serves to improve mechanical characteristics and wear resistance of the surface of a material, and a magnetic recording medium provided with the inorganic protective film.

2. Description of the Prior Art

As media for recording magnetic information, such as magnetic tapes and hard disks, magnetic recording media, which are provided with magnetic layers constituted of thin ferromagnetic metal films suitable for high density recording, have heretofore been used widely. The magnetic recording media, which are provided with magnetic layers constituted of thin ferromagnetic metal films, can easily achieve a high level of magnetic energy and a high level of surface smoothness. Therefore, the space between the magnetic recording medium and a magnetic head can be kept small, the spacing loss can be kept small, and good electromagnetic transducing characteristics can be obtained.

However, the wear resistance of the thin ferromagnetic metal film types of magnetic layers is lower than the wear resistance of conventional coated types of magnetic layers. Therefore, the thin ferromagnetic metal film types of magnetic layers have the problems in that they readily wear out due to sliding in contact with magnetic heads, or the like, and cannot have good durability. Accordingly, ordinarily, protective films, which are constituted of inorganic oxides, e.g. silica or zirconia, or carbon, are formed on the thin ferromagnetic metal film types of magnetic layers, and the wear resistance of the magnetic layers is thereby enhanced.

Among the protective films, carbon protective films have recently attracted particular attention. The carbon protective films are formed with a vacuum film forming process, such as a sputtering process or a chemical vapor deposition (CVD) process. Therefore, the carbon protective films have the problems in that they cannot be formed quickly and with a high mass production efficiency.

Also, the protective films formed with the vacuum film forming process cannot have sufficient covering properties. In cases where the substrates, on which the protective film is formed, have a complicated uneven shape, the problems occur in that pinholes readily occur in the protective film. These problems are increased when the thickness of the protective film is thin. With the protective film having a film thickness of not larger than 20 nm, e.g. the protective film overlaid on a magnetic recording medium, the problems occur in that, for example, the corrosion resistance cannot be enhanced to a desired level.

In cases where the protective films, which are constituted of inorganic oxides, are formed with the vacuum film forming process, the same problems as those with the carbon protective films are encountered. These problems can be eliminated by, for example, a technique for forming the inorganic oxide protective films with a sol-gel process. With this technique, the productivity can be enhanced. Also, even if the film thickness is thin, a protective film free from pinholes can be obtained regardless of the shape of the substrate, on which the protective film is formed, by appropriately selecting a coating method. Further, in cases where the sol-gel process is employed, it is possible to form protective films, which are constituted of various kinds of inorganic oxides, such as silica, zirconia, alumina, titania, and combinations of two or more of these oxides.

However, the coating film (i.e., the dry gel film), which is obtained with the sol-gel process by applying a sol composition to a substrate and drying it, is porous. Therefore, such that a sufficiently dense film may be obtained, the coating film must be fired at comparatively high temperatures, and should preferably be heated to a temperature of at least 500° C. Thus the sol-gel process requires heat treatment, which is severe even to hard disks formed on metal or glass substrates. In particular, it is difficult to apply the sol-gel process requiring severe heat treatment to flexible media formed on plastic substrates.

Further, in order for appropriate silica films to be formed with the sol-gel process, it is necessary to use acid catalysts for adjusting the rate of hydrolysis and the rate of polymerization of the starting materials, such as alkoxides. However, in cases where the acid catalysts are used, the problems occur in that the corrosion resistance of the magnetic layer is adversely affected and corrosion of the production apparatus is caused to occur.

Accordingly, it is considered to use a polysilazane capable of being converted into silica by oxidation and to form a silica protective film with a coating process. However, the temperature, at which the polysilazane can be converted into silica by heating and oxidation, is as high as at least 400° C. Even with easy-decomposition types of polysilazanes, the conversion temperature is as high as at least 250° C. Therefore, it was difficult to apply the coating process using polysilazanes to the film formation on substrates, such as plastic substrates, which are apt to be adversely affected by heat.

SUMMARY OF THE INVENTION

The primary object of the present invention is to provide a method for forming a silica protective film, with which a silica protective film is capable of being formed under low temperature conditions and such that it may have good mechanical characteristics and high corrosion resistance.

Another object of the present invention is to provide a process for producing a magnetic recording medium, wherein the method for forming a silica protective film is employed.

A further object of the present invention is to provide an inorganic protective film, the surface of which exhibits a reduced coefficient of friction during its sliding movement without depending upon the shape of a substrate and which has an enhanced durability and enhanced corrosion resistance.

A still further object of the present invention is to provide a magnetic recording medium, on which the inorganic protective film is formed.

The present invention provides a first method for forming a silica protective film, comprising the steps of:

i) forming a coating film, which is constituted of a polysilazane, on a substrate, ii) bringing active oxygen or ozone into contact with the coating film, the polysilazane in the coating film being thereby oxidized, and iii) thereby forming a protective film, which is constituted of silica, on the substrate.

The present invention also provides a first process for producing a magnetic recording medium, comprising the steps of:

i) forming a magnetic layer on at least either one of the surfaces of a non-magnetic substrate, ii) forming a coating film, which is constituted of a polysilazane, on the magnetic layer, iii) bringing active oxygen or ozone into contact with the coating film, the polysilazane in the coating film being thereby oxidized, and iv) thereby forming a protective film, which is constituted of silica, on the magnetic layer.

In the first method for forming a silica protective film and the first process for producing a magnetic recording medium in accordance with the present invention, the polysilazane is employed as the starting material for the formation of the silica protective film. A polysilazane solution is coated on the substrate or the magnetic layer, and the resulting coating film is then dried. Thereafter, active oxygen or ozone is brought into contact with the coating film, and the polysilazane in the coating film is thereby oxidized. In this manner, the silica protective film is formed on the substrate or the magnetic layer.

The present invention further provides a second method for forming a silica protective film, comprising the steps of:

i) forming a coating film, which is constituted of a polysilazane, on a substrate, ii) exposing the coating film to light, the polysilazane in the coating film being thereby oxidized and polymerized, and iii) thereby forming a protective film, which is constituted of silica, on the substrate.

The present invention still further provides a second process for producing a magnetic recording medium, comprising the steps of:

i) forming a magnetic layer on at least either one of the surfaces of a non-magnetic substrate, ii) forming a coating film, which is constituted of a polysilazane, on the magnetic layer, iii) exposing the coating film to light, the polysilazane in the coating film being thereby oxidized and polymerized, and iv) thereby forming a protective film, which is constituted of silica, on the magnetic layer.

In the second method for forming a silica protective film and the second process for producing a magnetic recording medium in accordance with the present invention, the polysilazane is employed as the starting material for the formation of the silica protective film. A polysilazane solution is coated on the substrate or the magnetic layer, and the resulting coating film is then dried. Thereafter, the coating film is exposed to light, such as ultra-violet rays, and the polysilazane in the coating film is thereby oxidized and polymerized. In this manner, the silica protective film is formed on the substrate or the magnetic layer.

The present invention also provides an inorganic protective film comprising:

i) an inorganic oxide film obtained by subjecting a polysilazane film, which has been formed with a coating process, to oxidation treatment, and ii) fine particles contained in the inorganic oxide film.

The present invention further provides a magnetic recording medium comprising:

i) a non-magnetic substrate, ii) a magnetic layer, which is formed on at least either one of the surfaces of the non-magnetic substrate, and iii) an inorganic protective film, which is formed on the surface of the magnetic layer, the inorganic protective film comprising an inorganic oxide film and fine particles, which are contained in the inorganic oxide film.

With the first method for forming a silica protective film and the first process for producing a magnetic recording medium in accordance with the present invention, active oxygen or ozone is brought into contact with the polysilazane coating film, which has been formed on the substrate or the magnetic layer. The polysilazane in the polysilazane coating film is thereby oxidized and converted into silica, and the silica protective film is thereby formed. Therefore, the first method for forming a silica protective film and the first process for producing a magnetic recording medium in accordance with the present invention can achieve higher productivity and higher corrosion resistance than with the vacuum film forming process, such as the sputtering process. Also, a silica protective film, which has a higher density and a higher mechanical strength, can be formed under lower temperature conditions than with the sol-gel process, in which an alkoxysilane, or the like, is used as the starting material.

Further, with the first method for forming a silica protective film and the first process for producing a magnetic recording medium in accordance with the present invention, wherein the polysilazane is employed as the starting material, it is not necessary to use acid catalysts as in the sol-gel process. Therefore, the corrosion resistance of the magnetic recording medium is not adversely affected, and the corrosion of the production apparatus can be prevented.

In particular, the conversion of the polysilazane into silica is carried out by bringing active oxygen or ozone into contact with the polysilazane coating film. Therefore, the silica protective film can be formed at low treatment temperatures. Accordingly, even if a substrate or a non-magnetic substrate, which is constituted of a material deforming at comparatively low temperatures, such as a polyethylene terephthalate or a polyethylene naphthalate, is used, a silica protective film having good quality can be formed.

Accordingly, with the first method for forming a silica protective film and the first process for producing a magnetic recording medium in accordance with the present invention, the silica protective film can be formed on glass, metals, and materials having the risk of deforming or decomposing when being heated, such as substrates and non-magnetic substrates constituted of plastic materials, e.g. polyethylene terephthalates, polymer coating films, and magnetic layers. The silica protective film formed in this manner has a high mechanical strength and good gas blocking properties. Therefore, the silica protective film can be used in a wide variety of applications, such as hard coats, anti-corrosive films, anti-blocking films, insulating films, and uneven-surface smoothing films.

With the second method for forming a silica protective film and the second process for producing a magnetic recording medium in accordance with the present invention, the polysilazane coating film, which has been formed on the substrate or the magnetic layer, is exposed to light, such as ultra-violet rays. The polysilazane in the polysilazane coating film is thereby oxidized and polymerized. The polysilazane is thus converted into silica, and the silica protective film is thereby formed. Therefore, the second method for forming a silica protective film and the second process for producing a magnetic recording medium in accordance with the present invention can achieve higher productivity and higher corrosion resistance than with the vacuum film forming process, such as the sputtering process. Also, a silica protective film, which has a higher density and a higher mechanical strength, can be formed under lower temperature conditions than with the sol-gel process, in which an alkoxysilane, or the like, is used as the starting material.

Further, with the second method for forming a silica protective film and the second process for producing a magnetic recording medium in accordance with the present invention, wherein the polysilazane is employed as the starting material, it is not necessary to use acid catalysts as in the sol-gel process. Therefore, the corrosion resistance of the magnetic recording medium is not adversely affected, and the corrosion of the production apparatus can be prevented.

In particular, the conversion of the polysilazane into silica is carried out by exposing the polysilazane coating film to light. Therefore, the silica protective film can be formed at low treatment temperatures. Accordingly, even if a substrate or a non-magnetic substrate, which is constituted of a material deforming at comparatively low temperatures, such as a polyethylene terephthalate or a polyethylene naphthalate, is used, a silica protective film having good quality can be formed.

Accordingly, with the second method for forming a silica protective film and the second process for producing a magnetic recording medium in accordance with the present invention, the silica protective film can be formed on glass, metals, and materials having the risk of deforming or decomposing when being heated, such as substrates and non-magnetic substrates constituted of plastic materials, e.g. polyethylene terephthalates, polymer coating films, and magnetic layers. The silica protective film formed in this manner has a high mechanical strength and good gas blocking properties. Therefore, the silica protective film can be used in a wide variety of applications, such as hard coats, anti-corrosive films, anti-blocking films, insulating films, and uneven-surface smoothing films.

With the inorganic protective film and the magnetic recording medium provided with the inorganic protective film in accordance with the present invention, good protective film functions can be obtained from the inorganic protective film. Also, with the inorganic protective film and the magnetic recording medium provided with the inorganic protective film in accordance with the present invention, wherein the inorganic oxide film contains the fine particles, the surface of the inorganic protective film is imparted with small protrusions and recesses, and therefore the coefficient of friction of the surface of the inorganic protective film can be kept low. Accordingly, even if the protective film is formed on the substrate, the problems can be prevented from occurring in that the actual contact area of the surface of the protective film with respect to a member, such as a magnetic head, increases, and in that the coefficient of friction thereby becomes large. Also, the inorganic protective film can be obtained which has an appropriate level of sliding properties and good durability.

Further, with the inorganic protective film and the magnetic recording medium provided with the inorganic protective film in accordance with the present invention, wherein the inorganic protective film is constituted of the polysilazane coating film, higher productivity and higher corrosion resistance can be achieved than with the vacuum film forming process, such as the sputtering process. Furthermore, a silica protective film, which has a higher density and a higher mechanical strength, can be formed under lower temperature conditions than with the sol-gel process, in which an alkoxysilane, or the like, is used as the starting material.

Moreover, with the inorganic protective film and the magnetic recording medium provided with the inorganic protective film in accordance with the present invention, wherein the polysilazane is employed as the starting material, it is not necessary to use acid catalysts as in the sol-gel process. Therefore, the corrosion resistance of the magnetic recording medium is not adversely affected, and the corrosion of the production apparatus can be prevented.

Also, with the inorganic protective film and the magnetic recording medium provided with the inorganic protective film in accordance with the present invention, the inorganic protective film can be formed on glass, metals, and materials having the risk of deforming or decomposing when being heated, such as substrates and non-magnetic substrates constituted of plastic materials, e.g. polyethylene terephthalates, polymer coating films, and magnetic layers. The inorganic protective film formed in this manner has a high mechanical strength and good gas blocking properties. Therefore, the inorganic protective film can be used in a wide variety of applications, such as hard coats, anti-corrosive films, anti-blocking films, and insulating films.

DETAILED DESCRIPTION OF THE INVENTION

The first method for forming a silica protective film and the first process for producing a magnetic recording medium in accordance with the present invention will hereinbelow be described in detail.

Polysilazanes are the silicon-containing polymers, which have a main chain structure represented by the formula

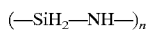

An example of the polysilazane has the structure represented by the formula

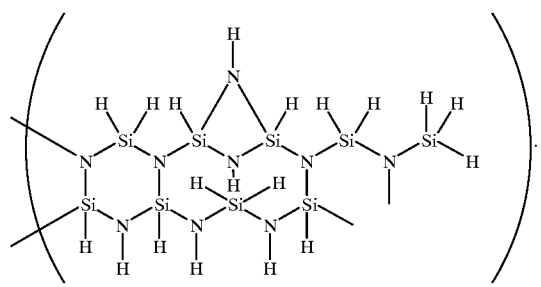

Such a polysilazane can be synthesized with the method described in, for example, Japanese Patent Publication No. 63(1988)-16325.

The polysilazane is converted into silica when being oxidized in air. Therefore, the polysilazane can be used as the starting material for the formation of silica. The density of the polysilazane coating film, which is the precursor of the silica protective film, is higher than the density of a dry gel film, which is the precursor of the silica protective film prepared with the sol-gel process. As a result, the polysilazane coating film exhibits little change in the volume due to decomposition and undergoes little cracking. Therefore, the polysilazane coating film has the features in that the critical film thickness of the silica film, which can be formed with a single coating operation, is thick, and in that a comparatively dense silica film can be obtained even under low temperature conditions.

In particular, with the first method for forming a silica protective film and the first process for producing a magnetic recording medium in accordance with the present invention, active oxygen or ozone is brought into contact with the polysilazane coating film, and the polysilazane in the coating film is thereby oxidized. Therefore, the temperature, at which the polysilazane is converted into silica, can be kept low, and a silica protective film having good quality can be obtained even at low temperatures close to room temperature. Also, the silica protective film can be formed on materials deforming at comparatively low temperatures, such as polyethylene terephthalates and polyethylene naphthalates, and various other materials, such as metals and glass.

The thickness of the silica protective film should preferably be at least 3 nm. In cases where the silica protective film having a thickness of 2 $\mu$m or more is to be obtained, it should preferably be formed with a method wherein a plurality of silica layers each having a thickness of approximately 1 $\mu$m are laminated one after another. In this manner, a silica protective film having uniform thickness can be formed easily and can be prevented from cracking after being dried.

In cases where the silica protective film is formed on the magnetic recording medium, the thickness of the silica protective film should preferably fall within the range of 3 nm to 30 nm, and should more preferably fall within the range of 5 nm to 20 nm. If the thickness of the silica protective film is smaller than the aforesaid range, the functions of the protective film cannot be achieved sufficiently. If the thickness of the silica protective film is larger than the aforesaid range, the spacing between the magnetic head and the magnetic layer of the magnetic recording medium will become large, and the reproduction output power will become low.

In the first method for forming a silica protective film and the first process for producing a magnetic recording medium in accordance with the present invention, in order for the polysilazane coating film to be formed on the substrate or the magnetic layer, a solution containing the aforesaid starting material in an organic solvent may be coated on the substrate or the magnetic layer with a technique, such as wire bar coating, gravure coating, spray coating, dip coating, or spin coating, and the resulting coating film may then be dried. The thickness of the polysilazane coating film can be adjusted by appropriately setting the concentration and the coating weight of the solution of the starting material.

As the solvent for dissolving the polysilazane, it is possible to use xylene, toluene, benzene, tetrahydrofuran (THF), or the like. Alcohols, such as ethanol, will undergo a reaction with the polysilazane, and therefore cannot be employed as the solvent.

The term "active oxygen" as used herein for the first method for forming a silica protective film and the first process for producing a magnetic recording medium in accordance with the present invention means an oxygen radical, an oxygen ion, or the like. In order for the active oxygen to be brought into contact with the polysilazane coating film, it is possible to employ, for example, the technique for carrying out oxygen plasma treatment in a vacuum, the technique for carrying out corona discharge treatment in air, or the technique for carrying out flame treatment by warming the surface of the polysilazane coating film over a gas burner, or the like, in air.

In cases where ozone is to be brought into contact with the polysilazane coating film in the first method for forming a silica protective film and the first process for producing a magnetic recording medium in accordance with the present invention, ozone may be generated by an ordinary ozone generator utilizing a discharge technique, an ultra-violet rays irradiating technique, a radiation irradiating technique, or the like.

In cases where ozone is used for oxidation treatment, no limitation is imposed upon the ozone concentration. However, in order for oxidation treatment to be carried out efficiently, the ozone concentration should fall within the range of 1 g/m$^3$ to 100 g/m$^3$ (500 ppm to 50,000 ppm), and should preferably fall within the range of 5 g/m$^3$ to 50 g/m$^3$ (2,500 ppm to 25,000 ppm). Oxidization treatment can be effected with an ozone contact time falling within the range of several seconds to several minutes.

In cases where active oxygen is used for oxidation treatment, the appropriate concentration of active oxygen depends upon how active oxygen is generated and how it is brought into contact with the polysilazane coating film.

During oxidation treatment, the temperature of the polysilazane coating film (or the temperature of the substrate) may be set to be equal to room temperature. However, in order for the rate of treatment to be kept high, the polysilazane coating film or the substrate should preferably be heated during oxidation treatment. The temperature, to which the polysilazane coating film or the substrate is heated, is set such that the substrate, or the like, may not be adversely affected, e.g. may not be deformed. For example, the substrate (or the non-magnetic substrate) constituted of a polyethylene terephthalate or a polyethylene naphthalate may be employed, the back surface of the substrate (or the non-magnetic substrate) may be brought into close contact with a heating roller, and the polysilazane coating film overlaid on the surface of the substrate or the magnetic layer may thereby be oxidized. In such cases, the substrate (or the non-magnetic substrate) may be heated to a temperature of approximately 100° C. In this manner, the rate of treatment can be kept high without the substrate (or the non-magnetic substrate) being adversely affected.

Also, in the first method for forming a silica protective film and the first process for producing a magnetic recording medium in accordance with the present invention, oxidation treatment may be carried out by bringing ozone into contact with the polysilazane coating film. In such cases, ultra-violet rays may be irradiated to the polysilazane coating film while ozone is being brought into contact with the polysilazane coating film. In this manner, the rate of treatment can be enhanced even further, and a denser silica protective film can be obtained. Specifically, ultra-violet rays having a wavelength component of 254 nm (which are produced by, for example, a low-pressure mercury vapor lamp or a high-pressure mercury vapor lamp) may be irradiated in an atmosphere containing ozone. As a result, the decomposition of ozone can be promoted, and the oxidation reaction can be accelerated.

In cases where ultra-violet rays having both the wavelength components of 185 nm and 254 nm (which are produced by, for example, a high-pressure mercury vapor lamp) are employed, ozone need not necessarily be introduced into the treatment atmosphere, and only oxygen may be present in the treatment atmosphere. Specifically, in such cases, ozone can be generated by the light having a wavelength of 185 nm. Therefore, approximately the same oxidation effects as those with the introduction of ozone into the treatment atmosphere can be obtained.

As the non-magnetic substrate used in the first process for producing a magnetic recording medium in accordance with the present invention, flexible media, such as a polymer film, or rigid media, such as a glass substrate and an aluminum substrate, may be employed. As the flexible medium, a film constituted of a polyethylene terephthalate, a polyethylene naphthalate, a polyimide, a polyamide, a polyamide-imide, or the like, and having a thickness falling within the range of 3 μm to 75 μm should preferably be employed. Also, fine powder (a filler) may be contained in the region inside of the substrate or in the surface of the substrate, and protrusions and recesses may thereby be formed on the surface of the substrate.

With the first process for producing a magnetic recording medium in accordance with the present invention, the silica protective film may be formed on the magnetic layer of a magnetic recording medium, such as a magnetic tape or a magnetic disk, having a non-magnetic substrate constituted of a polyethylene terephthalate, or the like. The first process for producing a magnetic recording medium in accordance with the present invention will hereinbelow be described in detail by taking the formation of the silica protective film on such a magnetic recording medium as an example.

In the first process for producing a magnetic recording medium in accordance with the present invention, a thin ferromagnetic metal film, which serves as the magnetic layer of the magnetic recording medium, can be formed with a known vacuum film forming process, such as a vacuum evaporation process or a sputtering process. In an oblique incidence vacuum evaporation process, the speed, with which the non-magnetic substrate for constituting the magnetic recording medium is moved during the vacuum evaporation process, is ordinarily at least 20 m/minute, and should preferably fall within the range of 50 m/minute to 200 m/minute. In the oblique incidence vacuum evaporation process, the degree of vacuum in a vacuum evaporation chamber is ordinarily at most $5 \times 10^{-5}$ torr, and should preferably be at most $1 \times 10^{-6}$ torr. No limitation is imposed on the type of the means for heating and evaporating the ferromagnetic metal. For example, an electron beam or induction heating may be utilized for this purpose.

In cases where the magnetic layer is formed with a continuous wind-up type of vacuum evaporation process, with which the magnetic layer can be formed quickly, a composition, which contains known metals or alloys and is primarily constituted of cobalt, may be employed as the composition which is to be evaporated. Specifically, Co, CoNi, CoFe, or the like, is subjected to vacuum evaporation in an oxygen atmosphere, and the magnetic layer containing oxygen is thereby formed on the non-magnetic substrate. In particular, such that the electromagnetic transducing characteristics may be enhanced, the magnetic layer should preferably be constituted of a composition of Co—O, Co—Fe containing Co—O, or the like, in which cobalt constitutes at least 90% of the metal atoms constituting the magnetic layer. In the magnetic layer, cobalt should more preferably constitute at least 95% of the metal atoms constituting the magnetic layer. The thickness of the magnetic layer should preferably fall within the range of 100 nm to 300 nm, and should more preferably fall within the range of 120 nm to 200 nm. The electromagnetic transducing characteristics can be enhanced even further by forming the magnetic layer comprising a plurality of layers.

The presence of oxygen gas during the vacuum evaporation is necessary in order to enhance the coercive force (Hc) of the magnetic layer. The proportion of oxygen should preferably be adjusted such that a coercive force falling within the range of 1,200 Oe to 2,000 Oe may be obtained. The proportion of oxygen in the magnetic layer should preferably fall within the range of 10% to 30%, and should more preferably fall within the range of 15% to 25%. The feed rate of oxygen during vacuum evaporation depends upon the width, over which vacuum evaporation is to be effected, and the speed, with which the non-magnetic substrate is moved. For example, in cases where a non-magnetic substrate having a width of 100 mm is moved at a speed of 20 m/minute during vacuum evaporation and a coercive force (Hc) of 1,600 Oe is to be obtained, oxygen may be fed at a rate of 250 cc/minute from a position in the vicinity of the minimum angle of incidence. In such cases, the partial oxygen pressure ordinarily falls within the range of $1 \times 10^{-5}$ torr to $5 \times 10^{-4}$ torr.

In cases where the magnetic layer is formed with the sputtering process, a composition, which contains known metals or alloys and is primarily constituted of cobalt, may be employed as the composition, which is to be sputtered. Specifically, the composition, which is to be sputtered, may be constituted of Co—Cr, Co—Ni—Cr, Co—Cr—Ta, Co—Cr—Pt, Co—Cr—Ta—Pt, Co—Cr—Pt—Si, Co—Cr—Pt—B, or the like. In particular, such that the electromagnetic transducing characteristics may be enhanced, Co—Cr—Ta or Co—Cr—Pt should preferably be employed. The thickness of the magnetic layer should preferably fall within the range of 10 nm to 300 nm.

Also, in cases where the magnetic layer is formed with the sputtering process, the electromagnetic transducing characteristics can be enhanced even further by forming the magnetic layer comprising a plurality of layers. Further, the magnetic recording medium may be provided with a prime-coating layer or an intermediate layer. The electromagnetic transducing characteristics can particularly be enhanced by the provision of a prime-coating layer, which is constituted of Cr or a Cr alloy. The thickness of the prime-coating layer ordinarily falls within the range of 30 nm to 300 nm.

Further, in the first process for producing a magnetic recording medium in accordance with the present invention, a top-coating film, which contains a lubricating agent for improving the friction characteristics and an anticorrosive agent for improving the corrosion resistance, should preferably be overlaid on the silica protective film of the magnetic recording medium. As the lubricating agents, known hydrocarbon types of lubricating agents, known fluorine types of lubricating agents, known extreme pressure additives, and the like, may be employed.

Examples of the hydrocarbon types of lubricating agents include carboxylic acids, such as stearic acid and oleic acid; esters, such as butyl stearate; sulfonic acids, such as octadecylsulfonic acid; phosphoric esters, such as monooctadecyl phosphate; alcohols, such as stearyl alcohol and oleyl alcohol; carboxylic acid amides, such as stearic acid amide; and amines, such as stearylamine.

Examples of the fluorine types of lubricating agents include the lubricating agents, in which the alkyl groups in each of the above-enumerated hydrocarbon types of lubricating agents are substituted in whole or in part by fluoroalkyl groups or perfluoro polyether groups. Examples of the perfluoro polyether groups include perfluoromethylene oxide polymer groups, perfluoroethylene oxide polymer groups, perfluoro-n-propylene oxide polymer groups $\{(CF_2CF_2CF_2O)_n\}$, perfluoroisopropylene oxide polymer groups $\{(CF(CF_3)CF_2O)_n\}$, and the groups of copolymers of the above-enumerated oxides.

Examples of the extreme pressure additives include phosphoric esters, such as trilauryl phosphate; phosphites, such as trilauryl phosphite; thiophosphites, such as trilauryl trithiophosphite; thiophosphoric esters; and sulfur types of extreme pressure additives, such as dibenzyl disulfide.

The above-enumerated lubricating agents may be used alone, or two or more of them may be used in combination. In order for the lubricating agent to be applied onto the silica protective film, the lubricating agent may be dissolved in an organic solvent, and the resulting solution may be coated on the silica protective film with a technique, such as wire bar coating, gravure coating, spin coating, or dip coating. Alternatively, the lubricating agent may be applied to the silica protective film with a vacuum evaporation process. The coating weight of the lubricating agent should preferably fall within the range of 1 mg/m² to 30 mg/m², and should more preferably fall within the range of 2 mg/m² to 20 mg/m².

Examples of the anticorrosive agents include nitrogen-containing heterocyclic compounds, such as benzotriazole, benzimidazole, purine, and pyrimidine; derivatives obtained by introducing alkyl side chains into the nuclei of the above-enumerated nitrogen-containing heterocyclic compounds; heterocyclic compounds containing nitrogen and sulfur, such as benzothiazole, 2-mercaptobenzothiazole, tetraazaindene ring compounds, and thiouracil compounds; and derivatives of the above-enumerated heterocyclic compounds containing nitrogen and sulfur.

Examples of the tetraazaindene ring compounds capable of being used for the aforesaid purposes include the compounds which may be represented by the formula

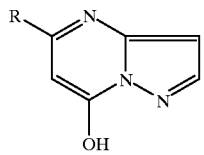

wherein R represents a hydrocarbon group selected from the group consisting of an alkyl group, an alkoxy group, and an alkyl amide group. The hydrocarbon group represented by R should preferably have 3 to 20 carbon atoms. Examples of the alkoxy groups include R'OCOCH$_2$—, in which R' represents C$_3$H$_7$—, C$_6$H$_{13}$—, or phenyl. Examples of the alkyl groups include C$_6$H$_{13}$—, C$_9$H$_{19}$—, and C$_{17}$H$_{35}$—. Examples of the alkyl amide groups include R"NHCOCH$_2$—, in which R" represents phenyl or C$_3$H$_7$—.

Examples of the thiouracil ring compounds include the compounds which may be represented by the formula

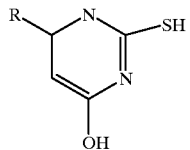

The second method for forming a silica protective film and the second process for producing a magnetic recording medium in accordance with the present invention will hereinbelow be described in detail.

With the second method for forming a silica protective film and the second process for producing a magnetic recording medium in accordance with the present invention, the polysilazane coating film is exposed to light, such as ultra-violet rays, and the polysilazane in the coating film is thereby oxidized and polymerized. Therefore, the temperature, at which the polysilazane is converted into silica, can be kept low, and a silica protective film having good quality can be obtained even at low temperatures close to room temperature. Also, the silica protective film can be formed on materials deforming at comparatively low temperatures, such as polyethylene terephthalates and polyethylene naphthalates, and various other materials, such as metals and glass.

The thickness of the silica protective film may be set to be the same value as that in the aforesaid first method for forming a silica protective film and the first process for producing a magnetic recording medium in accordance with the present invention. Also, as the techniques for forming the polysilazane coating film, the same techniques as those described above with respect to the aforesaid first method for forming a silica protective film and the first process for producing a magnetic recording medium in accordance with the present invention may be employed.

In the second method for forming a silica protective film and the second process for producing a magnetic recording medium in accordance with the present invention, as the light to be irradiated to the polysilazane, it is possible to employ infrared rays, ultra-violet rays, various kinds of laser beams, cathode rays, or the like. As for the ultra-violet rays, no limitation is imposed upon the kind of the source of the ultra-violet rays, and it is possible to employ an ordinary high-pressure mercury vapor lamp, an ordinary low-pressure mercury vapor lamp, an ordinary excimer lamp, or the like. However, such that the oxidation and polymerization of the polysilazane may be promoted, ultra-violet rays having the wavelength components of at most 200 nm should preferably be employed. Examples of the light sources capable of producing the ultra-violet rays having such wavelength components include a low-pressure mercury vapor lamp, which produces ultra-violet rays having a wavelength component of 185 nm, and an excimer lamp, which produces ultra-violet rays having a wavelength component of approximately 172 nm.

The exposure of the polysilazane to ultra-violet rays may be carried out in an inert gas atmosphere or in air. It is considered that ozone, which is produced slightly accompanying the irradiation of ultra-violet rays, will promote the oxidation of the polysilazane.

As the non-magnetic substrate used in the second process for producing a magnetic recording medium in accordance with the present invention, one of the same substrates as those described above with respect to the first process for producing a magnetic recording medium in accordance with the present invention may be employed. Also, as the process for forming the magnetic layer of the magnetic recording medium, one of the same processes as those described above with respect to the first process for producing a magnetic recording medium in accordance with the present invention may be employed. Further, one of the same kinds of the top-coating films as those described above should preferably be overlaid on the silica protective film of the magnetic recording medium.

The inorganic protective film and the magnetic recording medium provided with the inorganic protective film in accordance with the present invention will hereinbelow be described in detail.

In the magnetic recording medium provided with the inorganic protective film in accordance with the present invention, the magnetic layer should preferably be constituted of a thin ferromagnetic metal film formed with a vacuum film forming process. The thickness of the inorganic protective film should preferably fall within the range of 3 nm to 30 nm. The fine particles contained in the inorganic oxide film should preferably be constituted of an inorganic material and should preferably have a Mohs hardness of at least 3. The particle diameter of the fine particles should preferably fall within the range of 5 nm to 40 nm, and should more preferably fall within the range of 5 nm to 20 nm.

The inorganic oxide film in the inorganic protective film is a silicon oxide film, which is obtained by subjecting the polysilazane coating film to oxidation treatment. The inorganic oxide film constitutes a continuous film, in which silicon atoms and oxygen atoms are bound firmly to one another and thereby form a network structure.

The fine particles contained in the inorganic oxide film may be inorganic fine particles, which are constituted of oxides, nitrides, carbides, or the like. Alternatively, the fine particles may be organic fine particles. The size of the fine particles and the proportion of the fine particles in the inorganic oxide film may vary depending upon the protective functions, which the inorganic protective film is required to have. By being added to the inorganic protective film, the fine particles (a filler) form protrusions and recesses on the surface of the inorganic protective film. Therefore, the actual contact area of the surface of the inorganic protective film with respect to a member, such as a magnetic head, can be kept small, and the coefficient of friction can thereby be kept small. The fine particles should preferably be constituted of a material, which is harder than the material constituting the inorganic oxide film. In such cases, the wear resistance of the inorganic protective film can be enhanced even further.

Examples of the materials constituting the fine particles, which materials can be used in the inorganic protective film and the magnetic recording medium in accordance with the present invention, include inorganic oxides, such as silicon oxide (silica), aluminum oxide (alumina), zirconium oxide (zirconia), titanium oxide (titania), and chromium oxide; carbon materials, such as carbon black, diamond-state carbon, and diamond; and organic materials, such as polystyrene.

Such that a uniform surface can be obtained, the particle diameter of the fine particles added to the inorganic oxide film should preferably be approximately 1 to 3 times as large as the film thickness of the inorganic oxide film. However, the fine particles having a particle diameter smaller than the film thickness of the inorganic oxide film can impart the protrusions and recesses to the surface of the inorganic protective film, and can therefore be employed. The proportion of the fine particles added to the inorganic oxide film should be set appropriately, depending upon the characteristics, which the inorganic protective film should have.

For example, as described above, in cases where the fine particles are added to the inorganic protective film overlaid on the magnetic recording medium, the particle diameter of the fine particles should preferably fall within the range of approximately 5 nm to approximately 40 nm, and should more preferably fall within the range of approximately 5 nm to approximately 20 nm. If the particle diameter of the fine particles is smaller than this range, the fine particles will become apt to undergo agglomeration due to an increase in surface energy. In such cases, even if the fine particles can be dispersed in the coating composition, they cannot easily form the protrusion and recesses on the surface of the inorganic protective film. If the particle diameter of the fine particles is larger than this range, the maximum thickness of the inorganic protective film will become large. As a result, the spacing between the magnetic head and the magnetic layer will become large, and the electromagnetic transducing characteristics will become bad due to an increase in the spacing loss.

In the inorganic protective film and the magnetic recording medium in accordance with the present invention, oxidation treatment of the polysilazane coating film may be carried out with heating treatment, light irradiating treatment, or treatment for bringing active oxygen or ozone into contact with the polysilazane coating film. As a result of oxidation treatment, the silicon oxide film (a silica protective film) is formed.

Embodiments of the inorganic protective film in accordance with the present invention will be described hereinbelow.

In the embodiments of the inorganic protective film in accordance with the present invention, a polysilazane coating film, which contains the fine particles (a filler), is formed on the surface of a substrate (a material to be protected). Thereafter, the polysilazane coating film is subjected to oxidation treatment. In this manner, an inorganic protective film (hereinbelow referred to as the silica protective film), which contains the fine particles in the inorganic oxide film (the silicon oxide film) and has protrusions and recesses on the surface, is obtained.

Particularly, in oxidation treatment of the polysilazane coating film, in cases where the polysilazane is converted into silicon oxide by heating, a conversion temperature of at least 400° C. is required. In cases where an easy-decomposition type of polysilazane is employed, the conversion temperature of at least 250° C. is required. In cases where the substrate is constituted of a material, such as a plastic material, which is apt to be affected by heat, oxidation treatment is carried out by exposing the polysilazane coating film to light, such as ultra-violet rays, or by bringing active oxygen or ozone into contact with the polysilazane coating film. In this manner, the temperature, at which the polysilazane is converted into silicon oxide, can be kept low, and a silica protective film having good quality can be obtained even at low temperatures close to room temperature. Also, the silica protective film can be formed on materials deforming at comparatively low temperatures, such as polyethylene terephthalates and polyethylene naphthalates, and various other materials, such as metals and glass.

In the embodiments of the inorganic protective film in accordance with the present invention, the thickness of the silica protective film may be set to be the same value as that in the aforesaid first method for forming a silica protective film and the first process for producing a magnetic recording medium in accordance with the present invention. Also, as the techniques for forming the polysilazane coating film, the same techniques as those described above with respect to the aforesaid first method for forming a silica protective film and the first process for producing a magnetic recording medium in accordance with the present invention may be employed.

In the embodiments of the inorganic protective film in accordance with the present invention, in order for the fine particles to be contained in the polysilazane coating film, the fine particles may previously be coated on the substrate, and thereafter a polysilazane solution may be applied to the substrate. Alternatively, the fine particles may be dispersed in a solvent, such as xylene or toluene, which does not react with the polysilazane, the resulting dispersion may then be directly added to a polysilazane solution, and thereafter the thus obtained mixture may be coated on the substrate.

In the embodiments of the inorganic protective film in accordance with the present invention, in cases where the polysilazane is to be oxidized by heating, a polysilazane solution and the fine particles may be coated on the substrate, and may then be kept at a temperature of at least 150° C., and preferably at least 200° C., in an atmosphere containing water and oxygen.

In the embodiments of the inorganic protective film in accordance with the present invention, in cases where the polysilazane is to be oxidized by being exposed to light, such as ultra-violet rays, the polysilazane coating film may be exposed to, for example, ultra-violet rays produced by an ultra-violet lamp. As the light source, an ultra-violet ray source should preferably be employed. A low-pressure mercury vapor lamp or an excimer lamp, which produces ultra-violet rays having a wavelength component of at most 200 nm, e.g. 185 nm, should more preferably be employed. With the low-pressure mercury vapor lamp or the excimer lamp, the time required for oxidation treatment can be kept short.

Also, in the embodiments of the inorganic protective film in accordance with the present invention, in cases where the polysilazane is to be oxidized by being brought into contact with active oxygen or ozone, the polysilazane coating film may be brought into contact with ozone. Alternatively, the polysilazane coating film may be brought into contact with an oxygen plasma under a reduced pressure. As another alternative, the polysilazane coating film may be subjected to flame treatment in air. Ozone may be generated by an ordinary ozone generator utilizing a discharge technique, an ultra-violet rays irradiating technique, a radiation irradiating technique, or the like. In cases where ozone is used for oxidation treatment, no limitation is imposed upon the ozone concentration. However, in order for oxidation treatment to be carried out efficiently, the ozone concentration should fall within the range of 1 $g/m^3$ to 100 $g/m^3$ (500 ppm to 50,000 ppm), and should preferably fall within the range of 5 $g/m^3$ to 50 $g/m^3$ (2,500 ppm to 25,000 ppm). Oxidization treatment can be effected with an ozone contact time falling within the range of several seconds to several minutes.

In the embodiments of the inorganic protective film in accordance with the present invention, in cases where the polysilazane is to be oxidized by being brought into contact with active oxygen or ozone, even if the temperature of the substrate is approximately equal to room temperature, oxidation of the polysilazane can be achieved. Therefore, in such cases, the substrate may be constituted of a material, such as a plastic material, which has a low heat resistance. However, in order for the rate of treatment to be kept high, the substrate should preferably be heated during oxidation treatment. The temperature, to which the substrate is heated, is set such that the substrate, or the like, may not be adversely affected, e.g. may not be deformed. For example, the substrate constituted of a polyethylene terephthalate or a polyethylene naphthalate may be employed, the back surface of the substrate may be brought into close contact with a heating roller, and the polysilazane coating film overlaid on the surface of the substrate may thereby be oxidized. In such cases, the substrate may be heated to a temperature of approximately 100° C. In this manner, the rate of treatment can be kept high without the substrate being adversely affected.

The inorganic protective film described above may be formed on the magnetic layer of a magnetic recording medium, such as a magnetic tape or a magnetic disk, having a non-magnetic substrate constituted of a polyethylene terephthalate, or the like. In such cases, as the non-magnetic substrate of the magnetic recording medium, one of the same substrates as those described above with respect to the first process for producing a magnetic recording medium in accordance with the present invention may be employed. Also, as the process for forming the magnetic layer of the magnetic recording medium, one of the same processes as those described above with respect to the first process for producing a magnetic recording medium in accordance with the present invention may be employed. Further, one of the same kinds of the top-coating films as those described above should preferably be overlaid on the silica protective film of the magnetic recording medium.

EXAMPLES

The present invention will further be illustrated by the following nonlimitative examples.

Example 1

As a non-magnetic substrate, a 10 $\mu$m-thick polyester film was used. Spherical silica particles having a mean particle diameter of 30 nm and a solution, which contained tetraethoxysilane, methyltriethoxysilane, hydrochloric acid, water, and cyclohexanone, were coated on the non-magnetic substrate with a wire bar coating technique. In this manner, a prime-coating layer, which had a plurality of protrusions having a height of approximately 10 nm, was formed on the non-magnetic substrate. The number of the protrusions formed on the prime-coating layer was equal to $3\times10^6$ per a layer area of 1 $mm^2$.

The non-magnetic substrate, on which the prime-coating layer had been formed, was then subjected to an oblique incidence vacuum evaporation process. Specifically, in the oblique incidence vacuum evaporation process, the non-magnetic substrate was brought into close contact with a rotatable can having been cooled to a temperature of 0° C. and was conveyed along the rotatable can. In this state, cobalt serving as a magnetic metal was deposited to a thickness of 70 nm on the prime-coating layer in an oxygen-containing atmosphere. Also, the angle of incidence of the magnetic metal vapor stream upon the prime-coating layer was set to be equal to 45°. The oblique incidence vacuum evaporation process was carried out two times, and a magnetic layer, which had a total thickness of 140 nm and was constituted of the thin ferromagnetic metal film having a two-layer structure, was thereby formed on the prime-coating layer. In the two layers constituting the thin ferromagnetic metal film, the directions of inclination of the columnar grains of the magnetic metal constituting the thin film were identical with each other.

Thereafter, a solution containing a polysilazane (supplied by Tonen Corporation) in m-xylene was coated on the magnetic layer with a wire bar coating technique, and the resulting polysilazane coating film was dried at a temperature of 100° C. Decomposition, oxidation, and polymerization of the polysilazane coating film were then carried out by bringing the back surface of the non-magnetic substrate into contact with a roller, which had been heated to a temperature of 100° C., and blowing an ozone gas, which had been produced with a discharge technique and had a concentration of 50 $g/m^3$, to the polysilazane coating film having been formed on the front surface side of the non-magnetic substrate. In this manner, the polysilazane in the polysilazane coating film was converted into silica, and a silica protective film was formed. With observation of very thin slices of the obtained silica protective film using a transmission electron microscope (TEM), the film thickness of the silica protective film was found to be approximately 17 nm.

A backing coat, which was constituted of carbon black and a resin binder, was then formed on the back surface of the non-magnetic substrate with a wire bar technique. Thereafter, a perfluoro polyether type of lubricating agent (FOMBLIN Z-DOL supplied by Montefluos Co., Ltd.), which had hydroxyl groups at both terminals, was dissolved in a fluorine type of solvent (ZS-100 supplied by Montefluos Co., Ltd.), and the obtained solution was coated on the silica protective film with a wire bar coating technique such that the coating weight might become equal to 20 mg/m². The coated solution was then dried. The web having thus been obtained was cut to a width of 8 mm, and a sample of a magnetic recording medium (a magnetic tape) was thereby obtained.

Example 2

In this example, heating temperature conditions lower than those in Example 1 were employed during oxidation. Specifically, a sample of a magnetic recording medium (a magnetic tape) was obtained in the same manner as that in Example 1, except that the temperature of the heating roller was set to be equal to 50° C. during oxidation of the polysilazane coating film with ozone.

Example 3

In this example, a sample of a magnetic recording medium (a magnetic tape) was obtained in the same manner as that in Example 1, except that oxygen plasma treatment was carried out in lieu of ozone treatment after the polysilazane coating film had been formed. In oxygen plasma treatment, the polysilazane coating film having been formed on the magnetic layer was introduced into a vacuum chamber. The vacuum chamber was evacuated into a vacuum, and 800 W radio-frequency electric power was applied to a 100 mm-diameter quartz torch provided with a radio-frequency exciting coil. Also, an oxygen gas was introduced at a flow rate of 200 cc/minute into the torch, and an oxygen plasma was thereby produced. The polysilazane coating film having been formed on the magnetic layer was thus treated such that the polysilazane coating film might be in contact with the plasma for 30 seconds.

Comparative Example 1

In this comparative example, oxidation treatment with ozone was not carried out. Specifically, a sample of a magnetic recording medium (a magnetic tape) was obtained in the same manner as that in Example 1, except that the step of oxidizing the polysilazane coating film with ozone in Example 1 was omitted.

Comparative Example 2

In this comparative example, a polysilazane was not used. A protective film was formed with a sol-gel process and dried at a temperature of 100° C. Specifically, in the sol-gel process, hydrochloric acid was added to a solution, which contained tetraethoxysilane in ethanol, and the resulting mixture was stirred for 10 hours. In lieu of the polysilazane solution in Example 1, the thus obtained mixture was coated on the magnetic layer and dried. In this manner, a dry gel film serving as a precursor of silica was formed with the sol-gel process. The other procedures were the same as those in Example 1. A sample of a magnetic recording medium (a magnetic tape) was thus obtained.

Comparative Example 3

In this comparative example, a polysilazane was not used. A protective film was formed with a sol-gel process and dried at a temperature of 50° C. Specifically, in the sol-gel process, hydrochloric acid was added to a solution, which contained tetraethoxysilane in ethanol, and the resulting mixture was stirred for 10 hours. In lieu of the polysilazane solution in Example 2, the thus obtained mixture was coated on the magnetic layer and dried. In this manner, a dry gel film serving as a precursor of silica was formed with the sol-gel process. The other procedures were the same as those in Example 2. A sample of a magnetic recording medium (a magnetic tape) was thus obtained.

Comparative Example 4

In this comparative example, no protective film was formed. Specifically, a sample of a magnetic recording medium (a magnetic tape) was obtained in the same manner as that in Example 1, except that the polysilazane solution in Example 1 was not coated on the magnetic layer, and except that the lubricating agent was coated directly on the magnetic layer provided with no silica protective film.

As for the samples obtained in Examples 1, 2, and 3, and Comparative Examples 1, 2, 3, and 4, rating was carried out with the wear resistance tests and the corrosion resistance test described below. The results shown in Table 1 were obtained.

(1) Scratch resistance test

A load of 10 g was applied to a 4 mm-diameter steel ball, and the steel ball was reciprocally slid over a length of distance of 30 mm on the sample at a speed of 10 mm/second. Thereafter, the state of the surface of the sample, on which the steel ball was slid, was investigated with an optical microscope. Also, the load was increased at an increment of 10 g, and the value of the load, with which scratches occurred on the surface of the sample, was taken as the scratch resistance. The rating was carried out up to a load of 120 g.

(2) Still durability test

An image of color bars was recorded by using a video tape recorder, which was obtained by modifying an 8 mm video tape recorder (supplied by Fuji Photo Film Co., Ltd.). Thereafter, reproduction was carried out in a still mode. The durability before the output power decreased by 3 dB was taken as the still durability. The environmental conditions were 23° C. and 5% relative humidity. The load was 20 g/8 mm. The rating was carried out up to 30 minutes.

(3) Sulfur dioxide corrosion resistance test

The sample was kept for 72 hours in air containing sulfur dioxide in a proportion of 1 ppm, and thereafter the state of the surface of the sample was investigated. The environmental conditions were 27° C. and 80% relative humidity. After the test, the corrosion resistance was rated on a scale described below.

○: Slight corrosion occurred, but the magnetic layer remained approximately over the entire area of the sample.

X: The magnetic layer was dissolved perfectly.

Δ: The state of the sample surface was intermediate between "○" and "X".

TABLE 1

|  | Scratch resistance | Still durability | Sulfur dioxide corrosion resistance |
| --- | --- | --- | --- |
| Example 1 | 120 g or more | 30 minutes or more | ○ |
| Example 2 | 100 g | 30 minutes or more | ○ |
| Example 3 | 120 g or more | 30 minutes or more | ○ |

TABLE 1-continued

| | Scratch resistance | Still durability | Sulfur dioxide corrosion resistance |
|---|---|---|---|
| Comp. Ex. 1 | 80 g | 11 minutes | ○ |
| Comp. Ex. 2 | 30 g | 5 minutes | Δ |
| Comp. Ex. 3 | 30 g | 3 minutes | Δ |
| Comp. Ex. 4 | 20 g | 1 minute | × |

As can be understood from Table 1, the samples obtained in Examples 1, 2, and 3 and Comparative Example 1, in which the silica protective film was formed with the polysilazane coating film, had good corrosion resistance. However, with the sample of Comparative Example 1, in which oxidation treatment according to the present invention was not carried out, the degree of conversion to silica was insufficient, and the wear resistance was lower than the wear resistance of the samples of Examples 1, 2, and 3. Therefore, it could be confirmed that a good silica protective film was formed by low-temperature treatment.

Example 4

As a non-magnetic substrate, a 10 µm-thick polyester film was used. Spherical silica particles having a mean particle diameter of 30 nm and a solution, which contained tetraethoxysilane, methyltriethoxysilane, hydrochloric acid, water, and cyclohexanone, were coated on the non-magnetic substrate with a wire bar coating technique. In this manner, a prime-coating layer, which had a plurality of protrusions having a height of approximately 10 nm, was formed on the non-magnetic substrate. The number of the protrusions formed on the prime-coating layer was equal to $3 \times 10^6$ per a layer area of 1 mm$^2$.

The non-magnetic substrate, on which the prime-coating layer had been formed, was then subjected to an oblique incidence vacuum evaporation process. Specifically, in the oblique incidence vacuum evaporation process, the non-magnetic substrate was brought into close contact with a rotatable can having been cooled to a temperature of 0° C. and was conveyed along the rotatable can. In this state, cobalt serving as a magnetic metal was deposited to a thickness of 70 nm on the prime-coating layer in an oxygen-containing atmosphere. Also, the angle of incidence of the magnetic metal vapor stream upon the prime-coating layer was set to be equal to 45°. The oblique incidence vacuum evaporation process was carried out two times, and a magnetic layer, which had a total thickness of 140 nm and was constituted of the thin ferromagnetic metal film having a two-layer structure, was thereby formed on the prime-coating layer. In the two layers constituting the thin ferromagnetic metal film, the directions of inclination of the columnar grains of the magnetic metal constituting the thin film were identical with each other.

Thereafter, a solution containing a polysilazane (supplied by Tonen Corporation) in m-xylene was coated on the magnetic layer with a wire bar coating technique, and the resulting polysilazane coating film was dried at a temperature of 100° C. Decomposition, oxidation, and polymerization of the polysilazane coating film were then carried out by exposing the polysilazane coating film to ultra-violet rays (middle wavelengths: 254 nm and 185 nm) in air. The ultra-violet rays were produced by a low-pressure mercury vapor lamp (supplied by Orc Manufacturing Co., Ltd.). In this manner, the polysilazane in the polysilazane coating film was converted into silica, and a silica protective film was formed. During the exposure of the polysilazane coating film to the ultra-violet rays, the portion of the back surface of the non-magnetic substrate corresponding to the position exposed to the ultra-violet rays was brought into contact with a water cooling roller and was thereby cooled. With observation of very thin slices of the obtained silica protective film using a transmission electron microscope (TEM), the film thickness of the silica protective film was found to be approximately 17 nm.

A backing coat, which was constituted of carbon black and a resin binder, was then formed on the back surface of the non-magnetic substrate with a wire bar technique. Thereafter, a perfluoro polyether type of lubricating agent (FOMBLIN Z-DOL supplied by Montefluos Co., Ltd.), which had hydroxyl groups at both terminals, was dissolved in a fluorine type of solvent (ZS-100 supplied by Montefluos Co., Ltd.), and the obtained solution was coated on the silica protective film with a wire bar coating technique such that the coating weight might become equal to 20 mg/m$^2$. The coated solution was then dried. The web having thus been obtained was cut to a width of 8 mm, and a sample of a magnetic recording medium (a magnetic tape) was thereby obtained.

Example 5

In this example, the exposure of the polysilazane coating film to the ultra-violet rays was carried out in an inert gas atmosphere. Specifically, a sample of a magnetic recording medium (a magnetic tape) was obtained in the same manner as that in Example 4, except that the surface of the polysilazane coating film was exposed to the ultra-violet rays in an atmosphere having been replaced by a nitrogen gas.

Comparative Example 5

In this comparative example, the exposure of the polysilazane coating film to light was not carried out. Specifically, a sample of a magnetic recording medium (a magnetic tape) was obtained in the same manner as that in Example 4, except that the step of exposing the polysilazane coating film to the ultra-violet rays in Example 4 was omitted.

Comparative Example 6

In this comparative example, a polysilazane was not used. A protective film was formed with a sol-gel process, and the exposure to the ultra-violet rays was carried out in air. Specifically, in the sol-gel process, hydrochloric acid was added to a solution, which contained tetraethoxysilane in ethanol, and the resulting mixture was stirred for 10 hours. In lieu of the polysilazane solution in Example 4, the thus obtained mixture was coated on the magnetic layer and dried. In this manner, a dry gel film serving as a precursor of silica was formed with the sol-gel process. The other procedures were the same as those in Example 4. A sample of a magnetic recording medium (a magnetic tape) was thus obtained.

Comparative Example 7

In this comparative example, a polysilazane was not used. A protective film was formed with a sol-gel process, and the exposure to the ultra-violet rays was carried out in a nitrogen gas atmosphere. Specifically, in the sol-gel process, hydrochloric acid was added to a solution, which contained tetraethoxysilane in ethanol, and the resulting mixture was stirred for 10 hours. In lieu of the polysilazane solution in Example 5, the thus obtained mixture was coated on the magnetic layer and dried. In this manner, a dry gel film serving as a precursor of silica was formed with the sol-gel process. The other procedures were the same as those in Example 5. A sample of a magnetic recording medium (a magnetic tape) was thus obtained.

Comparative Example 8

In this comparative example, no protective film was formed. Specifically, a sample of a magnetic recording medium (a magnetic tape) was obtained in the same manner as that in Example 4, except that the polysilazane solution in Example 4 was not coated on the magnetic layer, and except that the lubricating agent was coated directly on the magnetic layer provided with no silica protective film.

As for the samples obtained in Examples 4 and 5 and Comparative Examples 5, 6, 7, and 8, rating was carried out with the wear resistance tests and the corrosion resistance test. The results shown in Table 2 were obtained.

The scratch resistance test, the still durability test, and the sulfur dioxide corrosion resistance test were carried out in the same manner as those described above.

TABLE 2

|  | Scratch resistance | Still durability | Sulfur dioxide corrosion resistance |
|---|---|---|---|
| Example 4 | 120 g or more | 30 minutes or more | ◯ |
| Example 5 | 120 g or more | 30 minutes or more | ◯ |
| Comp. Ex. 5 | 80 g | 11 minutes | ◯ |
| Comp. Ex. 6 | 40 g | 12 minutes | Δ |
| Comp. Ex. 7 | 40 g | 5 minutes | Δ |
| Comp. Ex. 8 | 20 g | 1 minute | × |

As can be understood from Table 2, the samples obtained in Examples 4 and 5 and Comparative Example 5, in which the silica protective film was formed with the polysilazane coating film, had good corrosion resistance. However, with the sample of Comparative Example 5, in which the exposure to the ultra-violet rays was not carried out, the degree of conversion to silica was insufficient, and the wear resistance was lower than the wear resistance of the samples of Examples 4 and 5. Therefore, it could be confirmed that a good silica protective film was formed by low-temperature treatment.

Example 6

As a non-magnetic substrate, a 10 μm-thick polyester film was used. A solution, which contained tetraethoxysilane, methyltriethoxysilane, and hydrochloric acid in cyclohexanone, was coated on the non-magnetic substrate with a wire gravure coating technique and was dried. In this manner, a prime-coating layer having a thickness of 0.2 μm was formed on the non-magnetic substrate. A substrate having a smooth surface substantially free from protrusions was thereby obtained.

The substrate was then subjected to an oblique incidence vacuum evaporation process. Specifically, in the oblique incidence vacuum evaporation process, the substrate was brought into close contact with a rotatable can having been cooled to a temperature of 0° C. and was conveyed along the rotatable can. In this state, cobalt serving as a magnetic metal was deposited to a thickness of 70 nm on the prime-coating layer in an oxygen-containing atmosphere. Also, the angle of incidence of the magnetic metal vapor stream upon the prime-coating layer was set to be equal to 45°. The oblique incidence vacuum evaporation process was carried out two times, and a magnetic layer, which had a total thickness of 140 nm and was constituted of the thin ferromagnetic metal film having a two-layer structure, was thereby formed on the prime-coating layer. In the two layers constituting the thin ferromagnetic metal film, the directions of inclination of the columnar grains of the magnetic metal constituting the thin film were identical with each other.

Thereafter, a spherical monodisperse silica sol, which was dispersed in toluene and had a mean particle diameter of 12 nm, was added as the fine particles to a solution containing a polysilazane (supplied by Tonen Corporation) in m-xylene. The resulting composition was coated on the magnetic layer with a gravure coating technique, and the resulting polysilazane coating film was dried at a temperature of 100° C. With observation of very thin slices of the obtained polysilazane coating film using a transmission electron microscope (TEM), the film thickness of the polysilazane coating film was found to be approximately 12 nm. With observation of the surface of the polysilazane coating film using an interatomic force microscope (AFM), it was found that a plurality of protrusions having a height falling within the range of 5 nm to 20 nm from the reference surface were formed on the surface of the polysilazane coating film. The number of the protrusions formed on the polysilazane coating film was equal to approximately 106 per a film area of 1 $mm^2$.

Thereafter, decomposition, oxidation, and polymerization of the polysilazane coating film were carried out by bringing the back surface of the non-magnetic substrate into contact with a roller, which had been cooled to a temperature of 20° C., and exposing the polysilazane coating film, which had been formed on the front surface side of the non-magnetic substrate, to ultra-violet rays (185 nm+254 nm) for a period of approximately one minute and in an nitrogen atmosphere. The ultra-violet rays were produced by a low-pressure mercury vapor lamp. In this manner, the polysilazane in the polysilazane coating film was converted into silica, and a silica protective film was formed.

A coating composition, which contained carbon black, abrasive grains (calcium carbonate), and a resin binder, was then coated on the back surface of the non-magnetic substrate with a wire bar technique, and a backing coat having a thickness of 0.5 μm was thereby formed. Thereafter, a perfluoro polyether type of lubricating agent (a mixture of FOMBLIN Z-DIAC and FOMBLIN Z-DOL in a ratio of 2:1, supplied by Montefluos Co., Ltd.), which had hydroxyl groups at both terminals, was dissolved in a fluorine type of solvent (ZS-100 supplied by Montefluos Co., Ltd.), and the obtained solution was coated on the silica protective film with a wire bar coating technique such that the coating weight might become equal to 20 $mg/m^2$. The coated solution was then dried. The web having thus been obtained was cut to a width of 8 mm, and a sample of a magnetic recording medium (a magnetic tape) was thereby obtained.

Example 7

In this example, a sample of a magnetic recording medium (a magnetic tape) was obtained in the same manner as that in Example 6, except that the step for oxidizing the polysilazane coating film was altered to oxygen plasma treatment.

In oxygen plasma treatment, the web provided with the polysilazane coating film was introduced into a continuous wind-up type of chemical vapor deposition (CVD) apparatus. The vacuum chamber was evacuated, and 800 W radio-frequency electric power was applied to a quartz torch provided with a radio-frequency exciting coil. Also, an oxygen gas was introduced at a flow rate of 200 ml/minute into the torch, and an oxygen plasma was thereby produced. The web was conveyed such that the polysilazane coating film might be in contact with the plasma for approximately 30 seconds.

Example 8

In this example, a sample of a magnetic recording medium (a magnetic tape) was obtained in the same manner as that in Example 6, except that the material of the non-magnetic substrate was altered to an aramid film, and except that oxidation treatment of the polysilazane coating film was altered to heat treatment for heating the polysilazane coating film at a temperature of 200° C. for one hour.

Comparative Example 9

In this comparative example, a sample of a magnetic recording medium (a magnetic tape) was obtained in the same manner as that in Example 6, except that the spherical monodisperse silica sol was not added to the polysilazane solution, and except that a silica protective film constituted of a polysilazane coating film substantially free from protrusions was formed. The number of protrusions having a height falling within the range of 5 nm to 20 nm was $10^4$ per a film area of 1 $mm^2$.

Comparative Example 10

In this comparative example, oxidation treatment was not carried out. Specifically, a sample of a magnetic recording medium (a magnetic tape) was obtained in the same manner as that in Example 6, except that the step of oxidizing the polysilazane coating film in Example 6 was omitted.

Comparative Example 11

In this comparative example, a polysilazane was not used, and a protective film was formed with a sol-gel process. Specifically, in the sol-gel process, hydrochloric acid was added to a solution, which contained tetraethoxysilane in ethanol, and the resulting mixture was stirred for 10 hours. Thereafter, a spherical monodisperse silica sol, which was dispersed in methanol and had a particle diameter of approximately 12 nm, was added to the aforesaid mixture. In lieu of the polysilazane solution in Example 6, the thus obtained composition was coated on the magnetic layer and dried. In this manner, a dry gel film serving as a precursor of silica was formed with the sol-gel process. The other procedures were the same as those in Example 6. A sample of a magnetic recording medium (a magnetic tape) was thus obtained. The film thickness of the gel film was approximately 12 nm, and the number of protrusions having a height falling within the range of 5 nm to 20 nm was approximately $7 \times 10^5$ per a film area of 1 $mm^2$.

Comparative Example 12

In this comparative example, a sample of a magnetic recording medium (a magnetic tape) was obtained in the same manner as that in Comparative Example 11, except that a 50 mol % portion of the amount of tetraethoxysilane in Comparative Example 11 was replaced by methyltriethoxysilane. In this case, the number of protrusions having a height falling within the range of 5 nm to 20 nm was $7 \times 10^5$ per a film area of 1 $mm^2$.

As for the samples obtained in Examples 6, 7, and 8 and Comparative Examples 9, 10, 11, and 12, rating was carried out with the wear resistance tests and the measurement of coefficient of friction. The results shown in Table 3 were obtained.

The scratch resistance test and the still durability test were carried out in the same manner as those described above. The measurement of coefficient of friction was carried out in the manner described below. Friction coefficient test with stainless steel guide pole:

The sample was brought into contact with a guide pole, which was constituted of a stainless steel (SUS420J), at a winding angle of 180° under environmental conditions of 23° C. and 5% relative humidity. A load of 20 g was applied to one end of the sample, and the other end of the sample was pulled and moved over a distance of 30 mm at a speed of 3.3 cm/second. At this time, the tension T was detected with a strain gauge, and the coefficient of friction $\mu$ was calculated with the formula $$\mu = (1/\pi) \cdot \ln(T/20)$$

The coefficient of friction was rated with the value obtained when the sample was moved ten times.

TABLE 3

| | Feature | Scratch resistance | Still durability | Coeff. of friction |
| --- | --- | --- | --- | --- |
| Ex. 6 | UV oxidation | 120 g or more | 30 minutes or more | 0.30 |
| Ex. 7 | Plasma oxidation | 120 g or more | 30 minutes or more | 0.31 |
| Ex. 8 | Heat oxidation | 120 g or more | 30 minutes or more | 0.31 |
| Comp. Ex. 9 | No filler | 120 g or more | 30 minutes or more | 0.45 |
| Comp. Ex. 10 | No oxidation | 80 g | 15 minutes | 0.35 |
| Comp. Ex. 11 | Sol-gel film | 50 g | 5 minutes | 0.33 |
| Comp. Ex. 12 | Sol-gel film | 50 g | 7 minutes | 0.34 |

As can be understood from Table 3, the samples obtained in Examples 6, 7, and 8 and Comparative Example 9, in which the silica protective film was formed by carrying out oxidation treatment of the polysilazane coating film, had good scratch resistance. The samples obtained in Examples 6, 7, and 8, in which the protective film contained the fine particles, had a coefficient of friction of as small as 0.30 or 0.31 by virtue of the protrusions and recesses formed on the surface of the protective film and exhibited good still durability. However, the sample of Comparative Example 9, in which the protective film did not contain the fine particles, had a very flat surface and exhibited a coefficient of friction of as large as 0.45.

Also, with the sample of Comparative Example 10, in which oxidation treatment was not carried out on the polysilazane coating film, the conversion into silicon oxide was insufficient, and the scratch resistance and the still durability of the sample of Comparative Example 10 were lower than the scratch resistance and the still durability of the samples of Examples 6, 7, and 8. With the protective films obtained with the sol-gel process in Comparative Examples 11 and 12, the scratch resistance and the still durability became still further lower. Therefore, it could be confirmed that the silica protective films suitable for the magnetic recording media could be formed in Examples 6, 7, and 8.

What is claimed is:

1. A process for producing a magnetic recording medium without heat step treatment, comprising the steps of:
   i) forming a magnetic layer on at least either one of the surfaces of a non-magnetic substrate,
   ii) forming a coating film, which is constituted of an inorganic polysilazane, on the magnetic layer,
   iii) exposing the coating film to light without heat step treatment, the polysilazane in the coating film being thereby oxidized and polymerized, and
   iv) thereby forming a protective film, which is constituted of silica, on the magnetic layer without heat step treatment;

wherein the substrate is an organic resin film.

2. A process for producing a magnetic recording medium without heat step treatment as defined in claim 1 wherein the light, to which the coating film is exposed, is ultra-violet rays having the wavelength components of at most 200 nm.

* * * * *